US011998161B2

(12) United States Patent
Bo

(10) Patent No.: US 11,998,161 B2
(45) Date of Patent: Jun. 4, 2024

(54) DUST SUCTION AND CHARGING DEVICE FOR FLOOR SWEEPING ROBOT, AND DUST SUCTION AND CHARGING METHOD THEREOF

(71) Applicant: BEIJING XIANGJIE SCIENCE AND TECHNOLOGY CO., LTD., Beijing (CN)

(72) Inventor: Liang Bo, Beijing (CN)

(73) Assignee: BEIJING XIANGJIE SCIENCE AND TECHNOLOGY CO., LTD., Beijing (CN)

( * ) Notice: Subject to any disclaimer, the term of this patent is extended or adjusted under 35 U.S.C. 154(b) by 982 days.

(21) Appl. No.: 16/939,055

(22) Filed: Jul. 27, 2020

(65) Prior Publication Data
US 2020/0359868 A1 Nov. 19, 2020

Related U.S. Application Data

(63) Continuation of application No. PCT/CN2019/100612, filed on Aug. 14, 2019.

(30) Foreign Application Priority Data

Dec. 25, 2018 (CN) .......................... 201811586621.7

(51) Int. Cl.
*A47L 9/28* (2006.01)
*A47L 9/00* (2006.01)
(Continued)

(52) U.S. Cl.
CPC ............. *A47L 9/2873* (2013.01); *A47L 9/009* (2013.01); *A47L 9/1683* (2013.01);
(Continued)

(58) Field of Classification Search
CPC ........... A47L 2201/02; A47L 2201/024; A47L 2201/022; A47L 9/2873; A47L 9/1683; A47L 9/0466; A47L 9/009; F16K 15/033
(Continued)

(56) References Cited

U.S. PATENT DOCUMENTS 7,779,504 B2 * 8/2010 Lee .......................... A47L 5/225
15/328
2005/0166352 A1 8/2005 Keppler et al.
2016/0374528 A1 * 12/2016 Morin .................... A47L 9/2842
15/319

FOREIGN PATENT DOCUMENTS

CN 106470584 A 3/2017
CN 106687019 A 5/2017
(Continued)

OTHER PUBLICATIONS

International Search Report issued in corresponding International application No. PCT/CN2019/100612, mailed on Oct. 29, 2019(4 pages).
(Continued)

*Primary Examiner* — Katina N. Henson
(74) *Attorney, Agent, or Firm* — Nitin Kaushik

(57) ABSTRACT

The present invention provides a dust suction and charging device for a floor sweeping robot and a dust suction and charging method thereof. The floor sweeping robot has a floor sweeping robot body with a dust box arranged on one side of the body. A dust-box discharge port is formed on the dust box and corresponds to a maintenance-station dust suction port. The maintenance-station dust suction port can be communicated with the dust-box discharge port by pressing an outer surface of the maintenance-station dust suction port. Advantages: (1) the charging, dust removal and maintenance operations on the floor sweeping robot are realized simultaneously; and, (2) dust in the dust box of the floor (Continued)

sweeping robot is sucked into a dust bag of the maintenance station by vacuum, so it is unnecessary to take out the dust box. Therefore, it is convenient to clean and will not pollute the external environment.

6 Claims, 18 Drawing Sheets

(51) Int. Cl.
*A47L 9/16* (2006.01)
*A47L 9/04* (2006.01)
*F16K 15/03* (2006.01)

(52) U.S. Cl.
CPC ....... *A47L 9/0466* (2013.01); *A47L 2201/022* (2013.01); *A47L 2201/024* (2013.01); *F16K 15/033* (2013.01)

(58) Field of Classification Search
USPC ............................................................ 15/3
See application file for complete search history.

(56) References Cited

FOREIGN PATENT DOCUMENTS

| | | | | |
|---|---|---|---|---|
| CN | 106955062 A | | 7/2017 | |
| CN | 107080502 A | * | 8/2017 | .............. A47L 11/24 |
| CN | 107080502 A | | 8/2017 | |
| CN | 107529930 A | | 1/2018 | |
| CN | 107811578 A | | 3/2018 | |
| CN | 109480714 A | | 3/2019 | |
| CN | 107007206 B | | 1/2020 | |
| DE | 102010000607 A1 | | 9/2011 | |
| JP | 2009165690 A | * | 7/2009 | |
| KR | 20100128839 A | | 12/2010 | |

OTHER PUBLICATIONS

Written Opinion of the International Searching Authority for No. PCT/CN2019/100612.

* cited by examiner

DUST SUCTION AND CHARGING DEVICE FOR FLOOR SWEEPING ROBOT, AND DUST SUCTION AND CHARGING METHOD THEREOF

CROSS REFERENCE TO RELATED APPLICATIONS

The present application is a continuation-application of International (PCT) Patent Application No. PCT/CN2019/100612 filed on Aug. 14, 2019, which claims foreign priorities of Chinese Patent Application No. CN201811586621.7, filed on Dec. 25, 2018, the entire contents of which are hereby incorporated by reference

FIELD OF THE INVENTION

The present invention belongs to the technical field of the dust suction of floor sweeping robots, and particularly relates to a dust suction and charging device for a floor sweeping robot and a dust suction and charging method thereof.

BACKGROUND OF THE INVENTION

Floor sweeping robots, also known as automatic sweepers, intelligent dust collectors, robot dust collectors or the like, are one kind of intelligent household appliances which are widely used at present.

The main operation process of an existing floor sweeping robot is as follows: the floor sweeping robot moves on the floor to suck garbage such as dust into its own dust box, thereby completing the floor cleaning function. However, a user needs to press a dust box release button on the surface of the floor sweeping robot at regular intervals to take out and clean the dust box. After the garbage in the dust box is removed, the dust box is reloaded into the floor sweeping robot.

The method for cleaning the dust box in the floor sweeping robot has the following disadvantage that the user needs to take out the dust box to empty the garbage in the dust box. Therefore, on one hand, the use burden of the user is increased, and on the other hand, the dust box is directly exposed to the environment for cleaning, which is not beneficial for the health of the cleaning user, but also has adverse impact on the environment.

SUMMARY OF THE INVENTION

In view of the deficiencies in the prior art, the present invention provides a dust suction and charging device for a floor sweeping robot and a dust suction and charging method thereof, which can effectively solve the above problems.

The present invention employs the following technical solutions.

The present invention provides a dust suction and charging device for a floor sweeping robot, including a maintenance station and a floor sweeping robot;
  a charging and dust suction base is provided in a lower portion of the maintenance station, and a maintenance-station dust suction port is formed on the charging and dust suction base; a dust bag accommodating box is arranged inside the maintenance station, and a dust bag is arranged inside the dust bag accommodating box; a dust suction fan is arranged outside the dust bag accommodating box and located in a cavity of the maintenance station, and an air suction port of the dust suction fan is communicated with the dust bag accommodating box to allow a negative pressure to be generated in the dust bag accommodating box; one end of a dust suction hose comes into contact with a dust inlet end of the dust bag, while the other end of the dust suction hose is fixedly connected to the maintenance-station dust suction port;
  the floor sweeping robot has a floor sweeping robot body; a dust box is arranged on one side of the floor sweeping robot; a dust-box discharge port is formed on the bottom of the dust box; the dust-box discharge port corresponds to the maintenance-station dust suction port; and, the maintenance-station dust suction port can be communicated with the dust-box discharge port by pressing an outer surface of the maintenance-station dust suction port; and
  the dust-box discharge port has a dust inlet end and a dust discharge end; a check valve assembly is mounted on an outer side of the dust inlet end; the check valve assembly comprises a valve, a valve torsion spring and a valve rotating shaft; the valve rotating shaft is fixedly mounted on the outer side of the dust inlet end; the valve is rotatably mounted on the valve rotating shaft; when the valve is rotated and pressed onto the dust inlet end, the valve seals the dust inlet end; the valve torsion spring is arranged on an outer side face of the valve and is used for applying, to the valve, a press force toward the dust inlet end, so as to press the valve onto the dust inlet end; and, when the outer side face of the valve is under a negative pressure, due to the negative pressure, the valve overcomes the press force from the valve torsion spring and moves in an opposite direction to open the dust inlet end.

Preferably, a fixed pipe is fixedly mounted on the outer side face of the valve; and, after the valve torsion spring passes through the fixed pipe, left and right ends of the valve torsion spring are wound around the valve rotating shaft, respectively.

Preferably, the maintenance station has a cover plate used for opening the dust bag accommodating box.

Preferably, the dust box has a cover for manually opening the dust box.

Preferably, an intermediate sweeper is arranged on the bottom of the floor sweeping robot; driving wheels are mounted on two sides of the intermediate sweeper; and, a universal wheel and side brushes are mounted on a bottom edge of the floor sweeping robot.

Preferably, a water tank is detachably mounted on a bottom of the floor sweeping robot body and located outside the dust-box discharge port, and a water tank detector for detecting whether the water tank is mounted is arranged on the floor sweeping robot body.

Preferably, a maintenance station contact tab is arranged on the charging and dust suction base, a charging contact tab is mounted at one end of the bottom of the floor sweeping robot body, and a dust discharge contact tab is mounted on the other end of the bottom of the floor sweeping robot body;
  a floor sweeping robot mainboard and a rechargeable battery are mounted inside the floor sweeping robot body; a first pin of the floor sweeping robot mainboard is electrically connected to the dust discharge contact tab; a second pin of the floor sweeping robot mainboard is connected to one end of the rechargeable battery, and the other end of the rechargeable battery is electrically connected to the charging contact tab; and the floor sweeping robot mainboard is also electrically connected to the water tank detector; and a maintenance station controller is mounted in the maintenance station, and the maintenance station controller is connected to the maintenance station contact tab, the dust suction fan and a charging control circuit, respectively.

The present invention further provides a dust suction and charging method of a dust suction and charging device for a floor sweeping robot, including the following steps:

step 1: a plurality of infrared emitters are mounted in different regions of a maintenance station, the infrared emitters are activated when a floor sweeping robot requires maintenance, and the infrared emitters emit infrared signals to different directions;

an infrared receiver arranged in the floor sweeping robot receives the infrared signals and determines a relative position between the infrared receiver and the maintenance station using the received infrared signals, and the floor sweeping robot moves close to the maintenance station according to the relative position;

meanwhile, the floor sweeping robot detects by a water tank detector whether a water tank is mounted; steps 2-5 will be executed if the water tank is not mounted; and, steps 6-7 will be executed if the water tank is mounted;

step 2: the floor sweeping robot adjusts its own direction to allow one end of the floor sweeping robot where a dust discharge contact tab is mounted faces toward the maintenance station;

then, the floor sweeping robot continues to move forward; when the floor sweeping robot detects that the dust discharge contact tab contacts and conducts with a maintenance station contact tab of the maintenance station, it indicates that the floor sweeping robot has moved in place, and at this time a dust-box discharge port of the floor sweeping robot is just pressed onto a maintenance-station dust suction port of the maintenance station; and the floor sweeping robot controls itself to stop moving;

step 3: when the dust discharge contact tab of the floor sweeping robot contacts and conducts with the maintenance station contact tab of the maintenance station, for the maintenance station, a maintenance station controller detects a dust discharge signal indicating that the dust discharge contact tab conducts with the maintenance station contact tab, and the maintenance station controller activates the dust suction process of the floor sweeping robot;

wherein the maintenance station controller activating the dust suction process of the floor sweeping robot includes specifically:

step 3.1: the maintenance station controller activates a dust suction fan, and the dust suction fan generates a negative pressure in a dust bag accommodating box, and then generates a negative pressure in a dust suction hose;

step 3.2: when a negative pressure is generated in the dust suction hose, due to the negative pressure, a valve overcomes a press force from a valve torsion spring and moves in an opposite direction to open a dust inlet end, so that the dust-box discharge port is opened;

step 3.3: when the dust-box discharge port is opened, due to the negative pressure, garbage in a cavity of the dust box successively passes through the dust-box discharge port and the maintenance-box dust suction port to be sucked into the dust suction hose and then sucked into the dust bag;

step 3.4: after the dust suction operation of the dust box is completed, the maintenance station controller turns off the dust suction fan; as the negative pressure disappears, the valve is pressed onto the dust inlet end of the dust-box discharge port under the action of the valve torsion spring, so that the dust inlet end of the dust-box discharge port is sealed and the garbage in the dust box is prevented from leakage; and step 3.5: the dust removal operation of the dust box ends;

step 4: the floor sweeping robot moves away from the maintenance station by a certain distance and is rotated by a certain angle, so that a charging contact tab of the floor sweeping robot faces toward the maintenance station;

the floor sweeping robot then continues to move forward; when the floor sweeping robot detects that the charging contact tab contacts and conducts with the maintenance station contact tab of the maintenance station, it indicates that the floor sweeping robot has moved in place, and the floor sweeping robot controls itself to stop moving at this time;

step 5: when the charging contact tab of the floor sweeping robot contacts and conducts with the maintenance station contact tab of the maintenance station, for the maintenance station, the maintenance station controller detects a charging signal indicating that the charging contact tab conducts with the maintenance station contact tab, and the maintenance station controller activates the charging process of the floor sweeping robot until the charging operation is completed;

step 6: the floor sweeping robot adjusts its own direction to allow one end of the floor sweeping robot where the charging contact tab is mounted faces toward the maintenance station;

the floor sweeping robot then continues to move forward; when the floor sweeping robot detects that the charging contact tab contacts and conducts with the maintenance station contact tab of the maintenance station, it indicates that the floor sweeping robot has moved in place, and the floor sweeping robot controls itself to stop moving at this time; and step 7: when the charging contact tab of the floor sweeping robot contacts and conducts with the maintenance station contact tab of the maintenance station, for the maintenance station, the maintenance station controller detects a charging signal indicating that the charging contact tab conducts with the maintenance station contact tab, and the maintenance station controller activates the charging process of the floor sweeping robot until the charging operation is completed.

The dust suction and charging device for a floor sweeping robot and the dust suction and charging method thereof provided by the present invention have the following advantages.

(1) A charging contact tab and a dust discharge contact tab are arranged at different positions on the bottom of the floor sweeping robot, and a maintenance station contact tab is arranged on the charging base of the maintenance station. When the charging contact tab comes into contact with the maintenance station contact tab, the maintenance station charges and maintains the floor sweeping robot; and, when the dust discharge contact tab comes into contact with the maintenance station contact tab, the maintenance station removes dust in the dust box of the floor sweeping robot by vacuum. Thus, the charging, dust removal and maintenance operations on the floor sweeping robot are realized simultaneously, and the functions are diversified.

(2) During the dust removal and maintenance of the floor sweeping robot by the maintenance station, garbage such as dust in the dust box of the floor sweeping robot is sucked into the dust bag of the maintenance station by vacuum, so it is unnecessary to take out the dust box from the floor sweeping robot for cleaning. Therefore, the present invention is convenient to clean and will not pollute the external environment.

BRIEF DESCRIPTION OF THE DRAWINGS

FIG. 25 is a state diagram when the dust bag is taken out from the maintenance station and the cover plate is closed;
in which:

100: maintenance station; 101: charging and dust suction base; 102: maintenance station contact tab; 103: maintenance-station dust suction port; 104: dust bag accommodating box; 105: dust bag; 106: dust suction hose; 107: dust suction fan; 108: cover plate;
200: floor sweeping robot; 201: floor sweeping robot body; 202: dust box; 203: dust-box discharge port; 2031: dust inlet end; 2032: dust discharge end; 204: valve; 205: valve torsion spring; 206: valve rotating shaft; 207: fixed pipe; 208: water tank; 209: charging contact tab; 210: dust discharge contact tab; 211: floor sweeping robot mainboard; 211a: first pin; 211b: second pin; 212: rechargeable battery; 213: water tank detector; 214: cover; 215: intermediate sweeper; 216: driving wheel; 217: universal wheel; 218: side brush; 219: dust box release button; 220: dust-box dust inlet; 221: button for manually opening the dust box; and, 222: seal ring.

DETAILED DESCRIPTION OF THE PREFERRED EMBODIMENT

To solve the technical problems, technical solutions and beneficial effects of the present invention clearer, the present invention will be further described below in detail by embodiments with reference to the accompanying drawings. It should be understood that the specific embodiments described herein are merely for explaining the present invention and not intended to limit the present invention.

Figure 1:
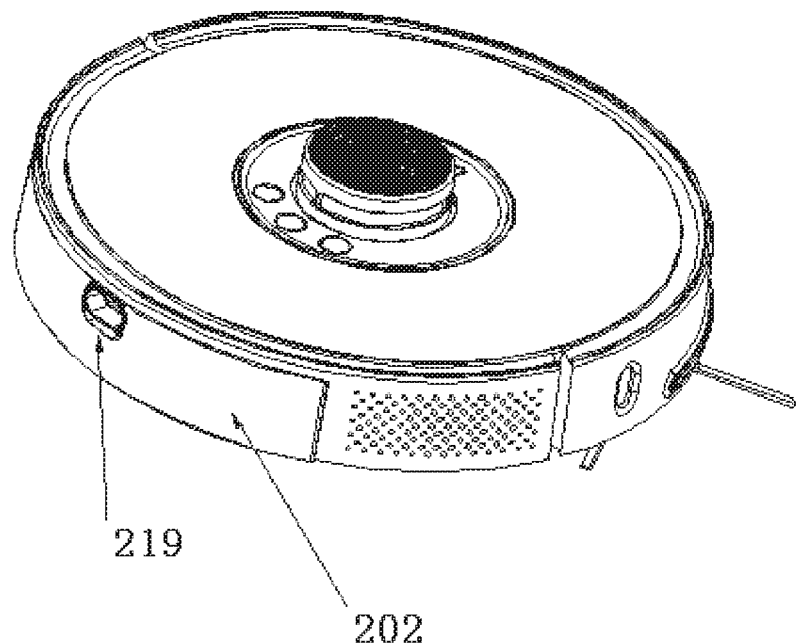
FIG. 1 is a stereoscopic view of the floor sweeping robot.
Figure 2:
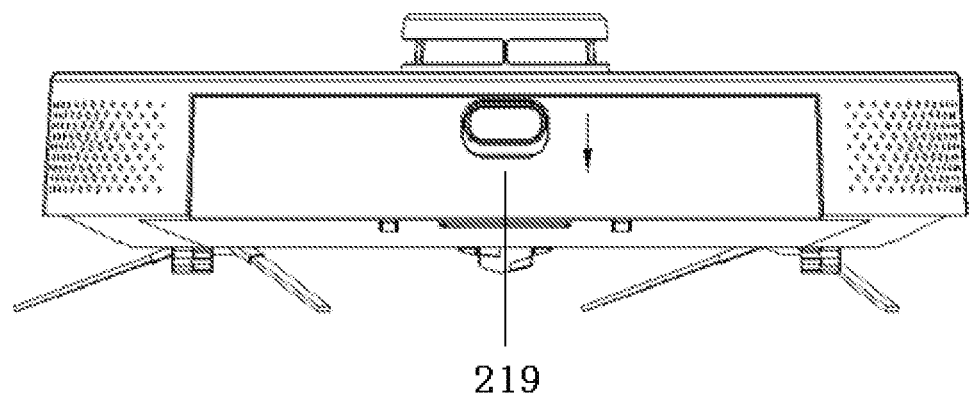
FIG. 2 is a side view of the floor sweeping robot.
Figure 3:
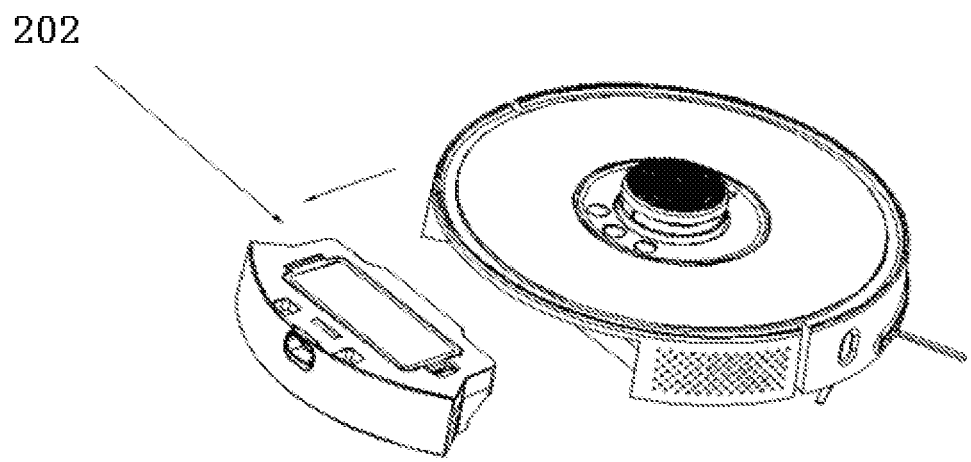
FIG. 3 is a state diagram when the dust box is taken out from the floor sweeping robot.
Figure 4:
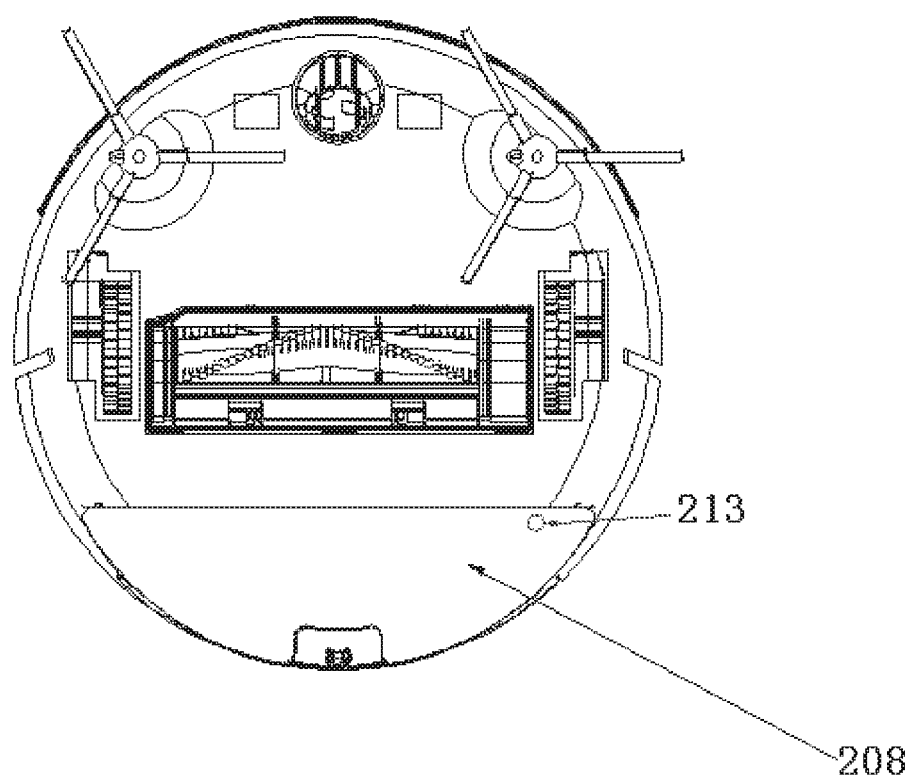
FIG. 4 is a bottom view when the water tank is mounted in the floor sweeping robot.
Figure 5:
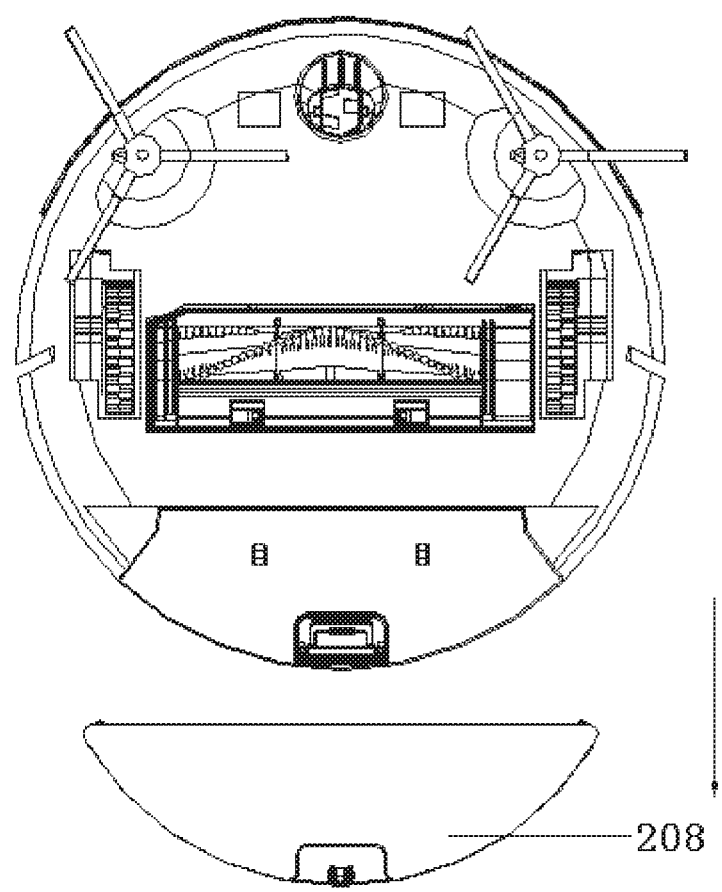
FIG. 5 is a state diagram when the water tank is taken out from the floor sweeping robot.

In the prior art, with reference to FIG. 1, a structural diagram of a floor sweeping robot is shown. A dust box release button 219 is mounted on the floor sweeping robot. When the dust box release button 219 is pressed down, a dust box 202 can be taken out. With reference to FIG. 3, a state diagram when the dust box is taken out from the floor sweeping robot is shown. In view of the problems of inconvenient cleaning, environment pollution and the like in the process of cleaning garbage in the dust box of the floor sweeping robot in the prior art, the present invention provides a dust suction and charging device for a floor sweeping robot and a dust suction and charging method thereof. The direction in which the floor sweeping robot returns to the maintenance station is controlled according to whether a water tank is mounted in the floor sweeping robot. If no water tank is mounted, a dust discharge contact tab of the floor sweeping robot comes into contact with a maintenance station contact tab of the maintenance station, and dust is removed from the floor sweeping robot. After the dust removal is completed, the floor sweeping robot moves away from the maintenance station and is rotated by a certain angle. Then, the floor sweeping robot moves forward, and a charging contact tab of the floor sweeping robot comes into contact with the maintenance station contact tab of the maintenance station, so that the floor sweeping robot is charged. If a water tank is mounted, the charging contact tab of the floor sweeping robot comes into contact with the maintenance station contact tab of the maintenance station, and the floor sweeping robot is only charged. In other words, in the present invention, if no water tank is mounted in the floor sweeping robot, the maintenance station removes dust from the dust box of the floor sweeping robot by vacuum and then charges the floor sweeping robot; and, if a water tank is mounted in the floor sweeping robot, the maintenance station only charges the floor sweeping robot. The present invention realizes the cooperative control of the charging and dust removal of the floor sweeping robot, and is convenient for a user to use. In addition, during the dust collection of the floor sweeping robot by the maintenance station, garbage such as dust in the dust box of the floor sweeping robot can be sucked into the dust bag of the maintenance station by vacuum, so it is unnecessary to take out the dust box from the floor sweeping robot for cleaning. Therefore, the present invention is convenient to clean and will not pollute the external environment.

The dust suction and charging device for a floor sweeping robot provided by the present invention includes a maintenance station 100 and a floor sweeping robot 200.

Figure 14:
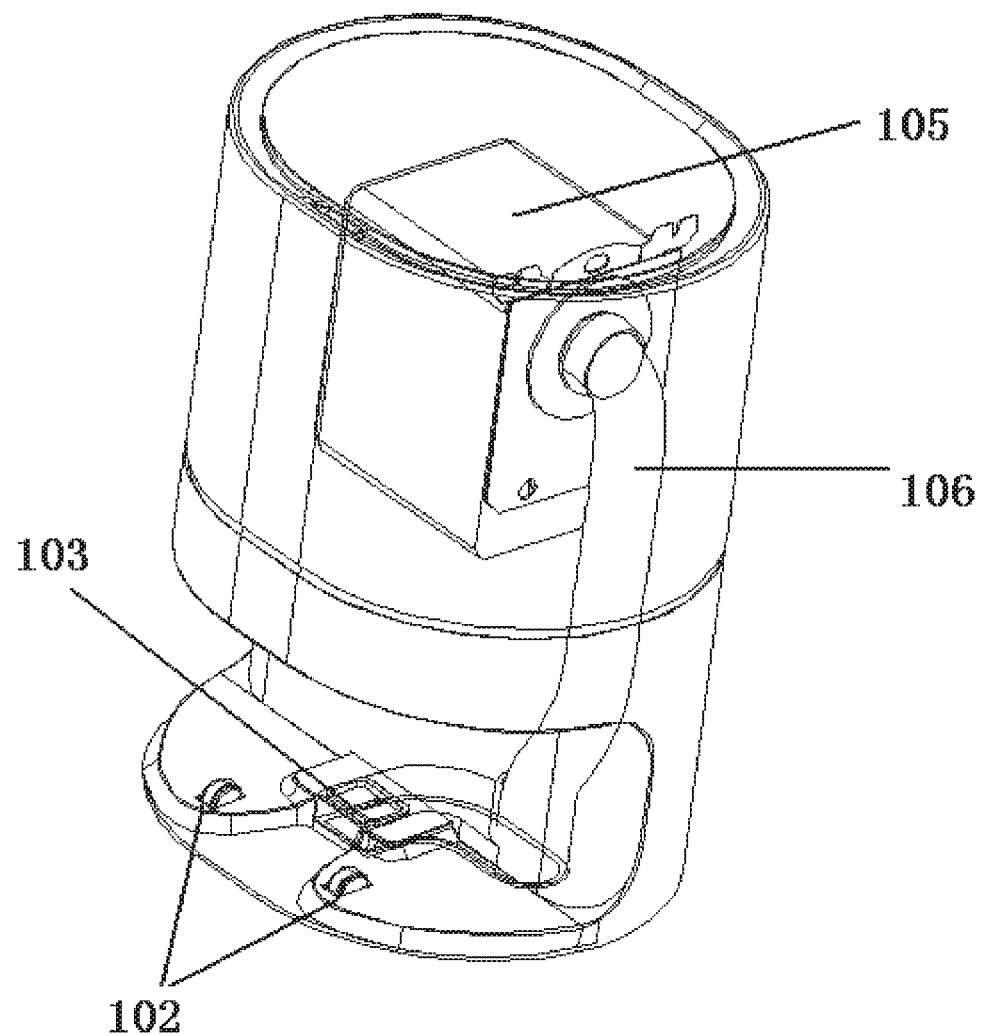
FIG. 14 is a perspective view of the maintenance station.
Figure 15:
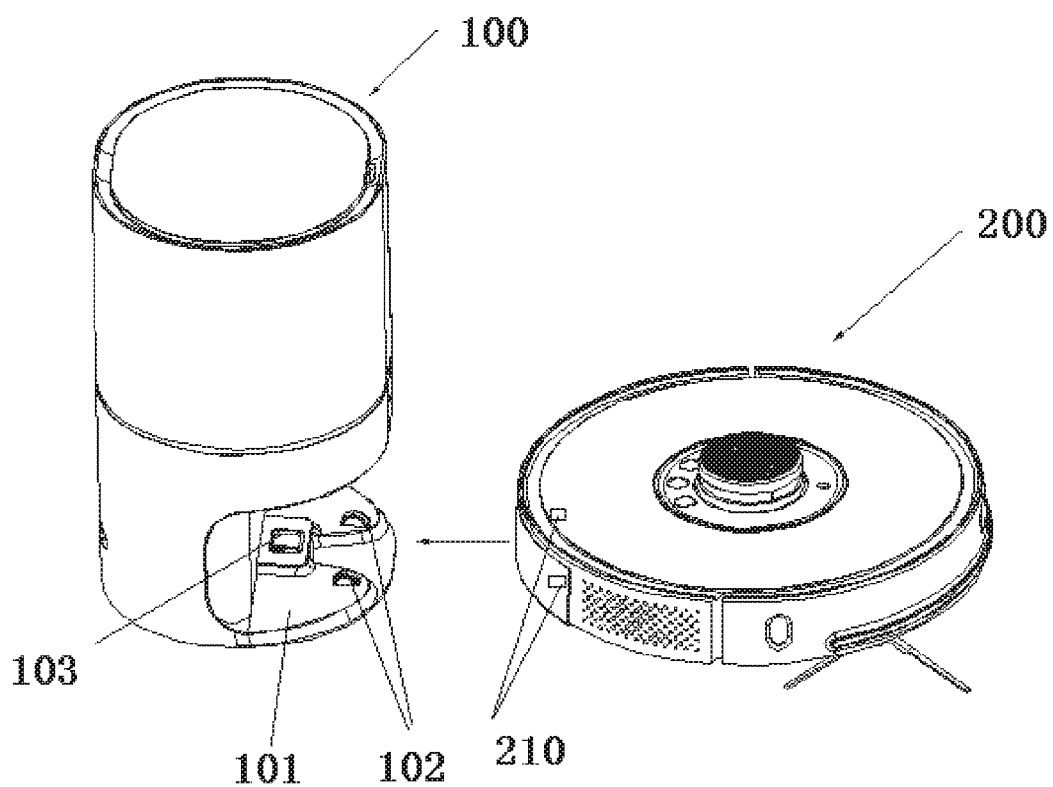
FIG. 15 is a process diagram of the floor sweeping robot moving close to the maintenance station when it needs to discharge dust.
Figure 18:
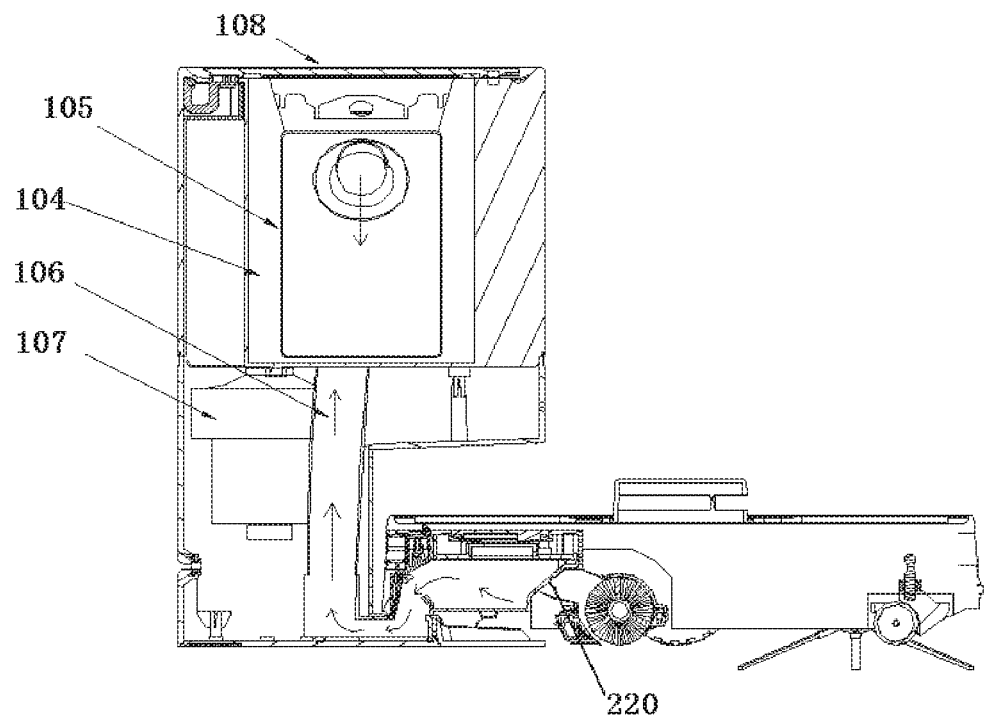
FIG. 18 is a sectional view of the floor sweeping robot when it needs to discharge dust and moves in place.
Figure 19:
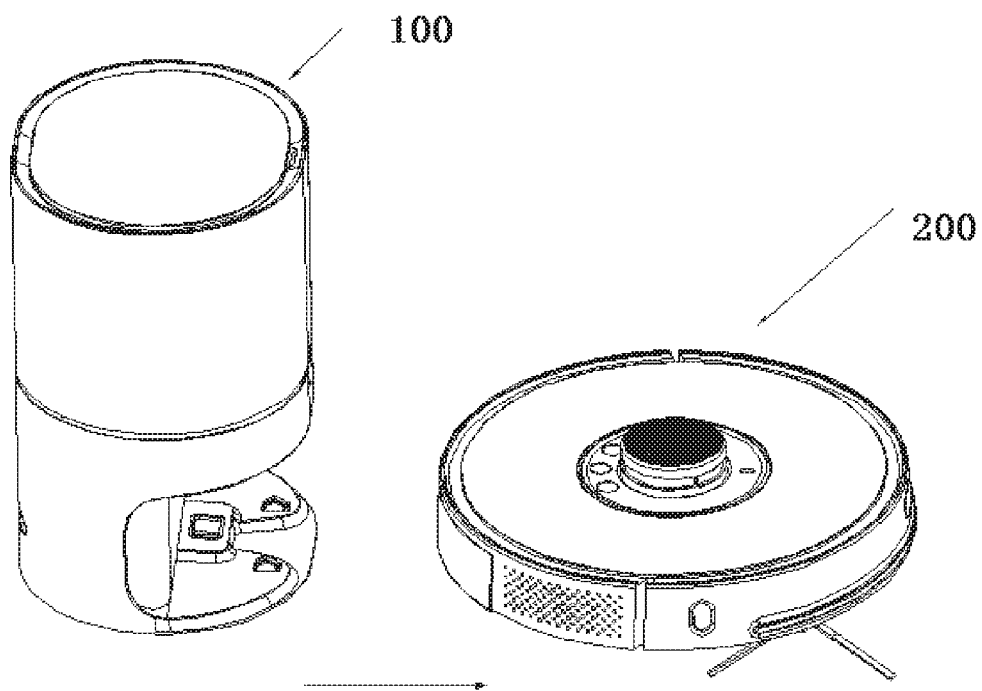
FIG. 19 is a process diagram of the floor sweeping robot moving away from the maintenance station after dust discharge.

With reference to FIGS. 14, 15 and 18, a charging and dust suction base 101 is provided in a lower portion of the maintenance station 100, and a maintenance-station dust suction port 103 is formed on the charging and dust suction base 101. A dust bag accommodating box 104 is arranged inside the maintenance station 100, and a dust bag 105 is arranged inside the dust bag accommodating box 104. A dust suction fan 107 is arranged outside the dust bag accommodating box 104 and located in a cavity of the maintenance station 100, and an air suction port of the dust suction fan 107 is communicated with the dust bag accommodating box 104 to allow a negative pressure to be generated in the dust bag accommodating box 104. One end of a dust suction hose 106 comes into contact with a dust inlet end of the dust bag 105, while the other end of the dust suction hose 106 is fixedly connected to the maintenance-station dust suction port 103.

Figure 16:
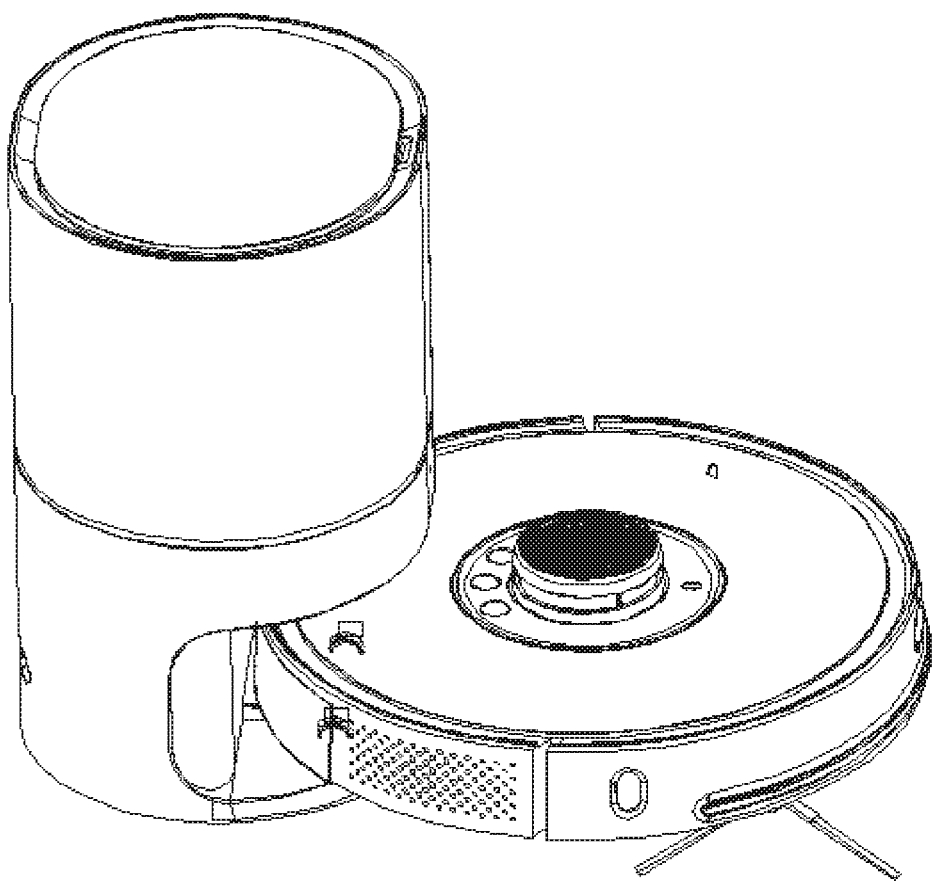
FIG. 16 is a state diagram of the floor sweeping robot moving in place when it needs to discharge dust.
Figure 17:
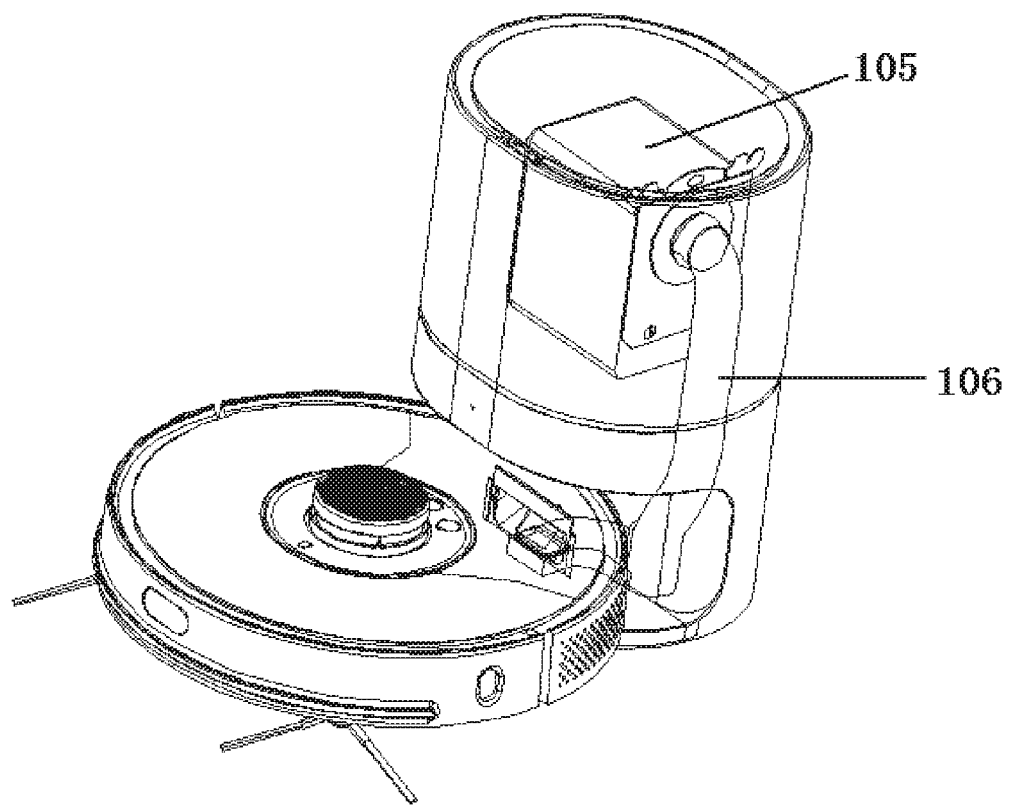
FIG. 17 is a perspective view of the floor sweeping robot when it needs to discharge dust and moves in place.

With reference to FIG. 15, the floor sweeping robot 200 has a floor sweeping robot body 201. A dust box 202 is arranged on one side of the floor sweeping robot 201. A dust-box discharge port 203 is formed on the bottom of the dust box 202. The dust-box discharge port 203 corresponds to the maintenance-station dust suction port 103. The maintenance-station dust suction port 103 can be communicated with the dust-box discharge port 203 by pressing the outside of the maintenance-station dust suction port 103. FIGS. 16 and 17 are schematic views when the floor sweeping robot is cooperated with the dust-box discharge port 203 and the maintenance-station dust suction port 103.

Figure 8:
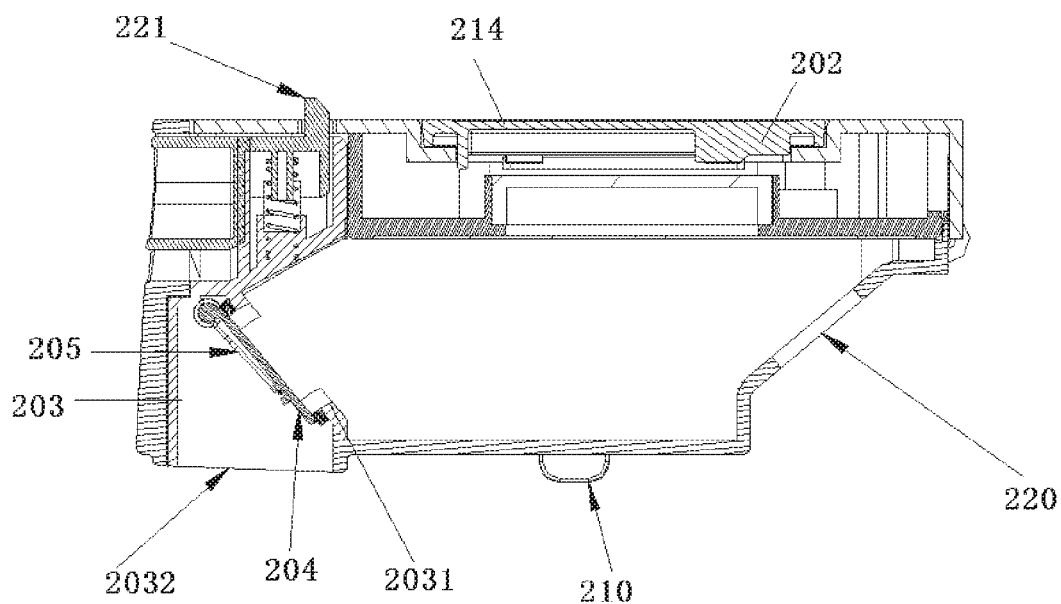
FIG. 8 is a sectional view of the dust box when the dust-box discharge port is closed.
Figure 9:
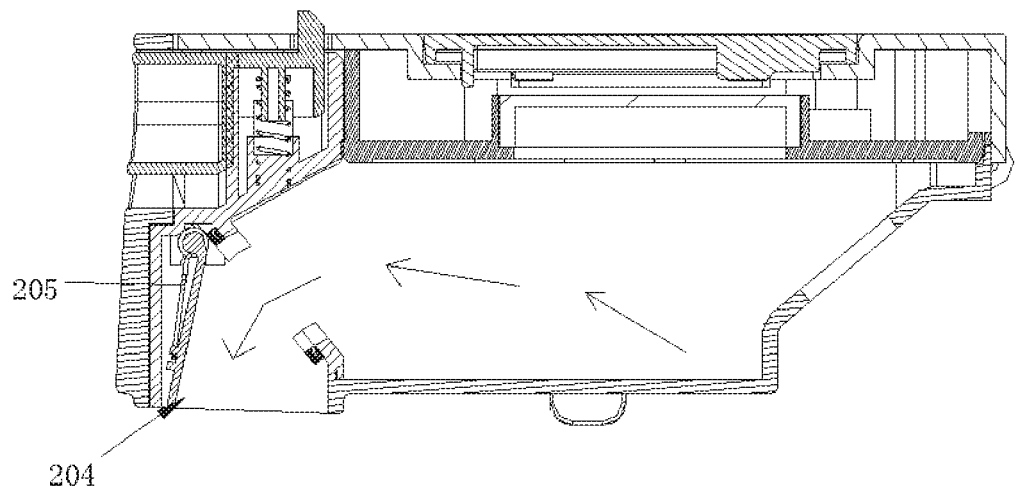
FIG. 9 is a sectional view of the dust box when the dust-box discharge port is opened.
Figure 10:
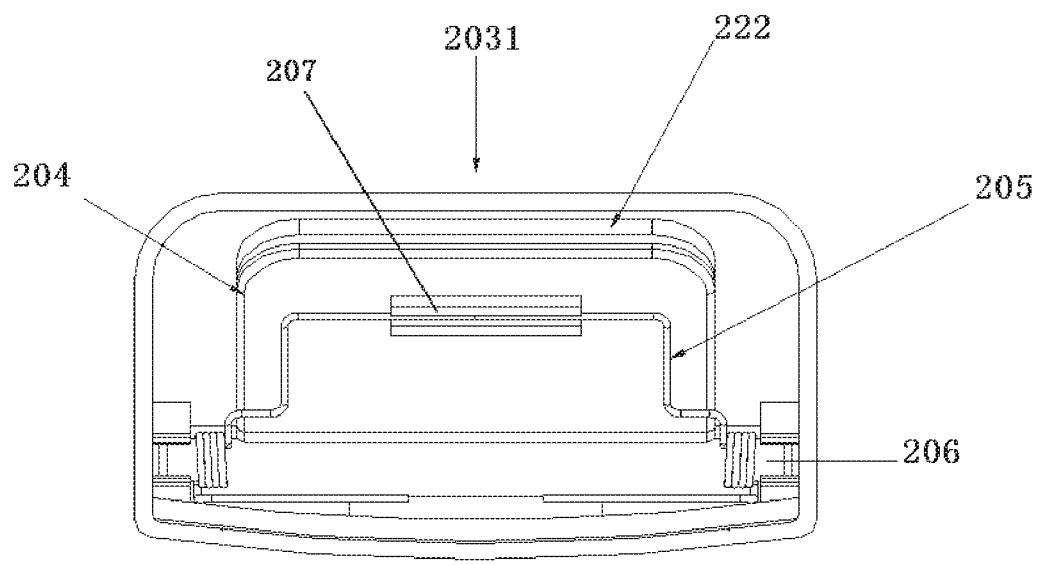
FIG. 10 is a structural diagram when the dust-box discharge port is closed.
Figure 11:
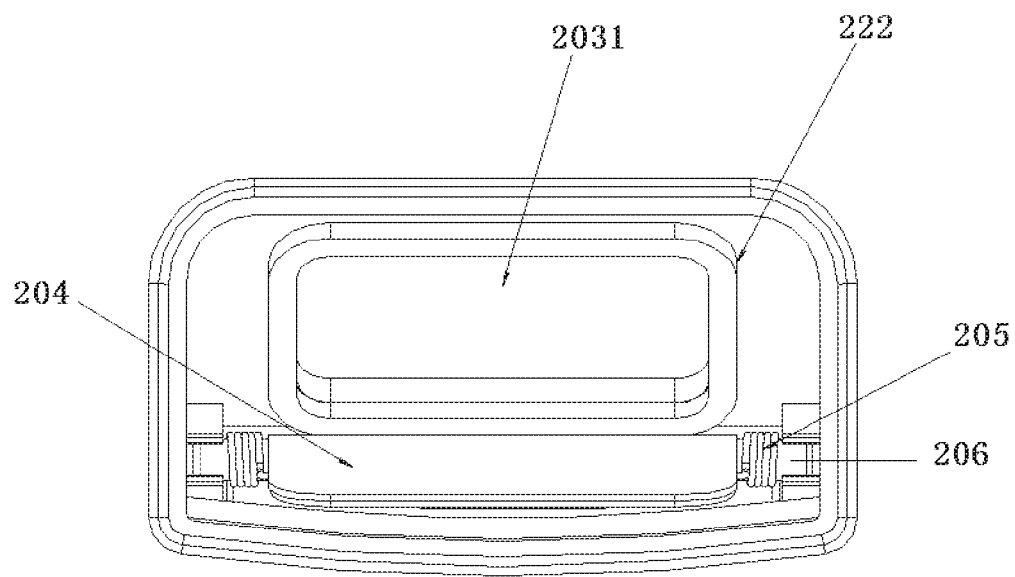
FIG. 11 is a structural diagram when the dust-box discharge port is opened.
Figure 12:
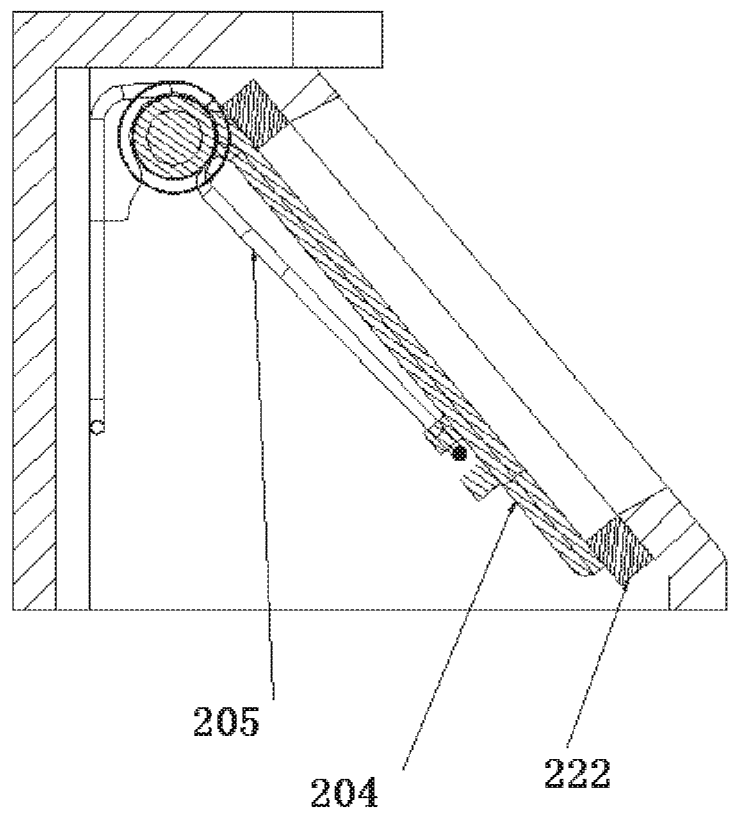
FIG. 12 is a structural diagram when the dust-box discharge port is closed.
Figure 13:
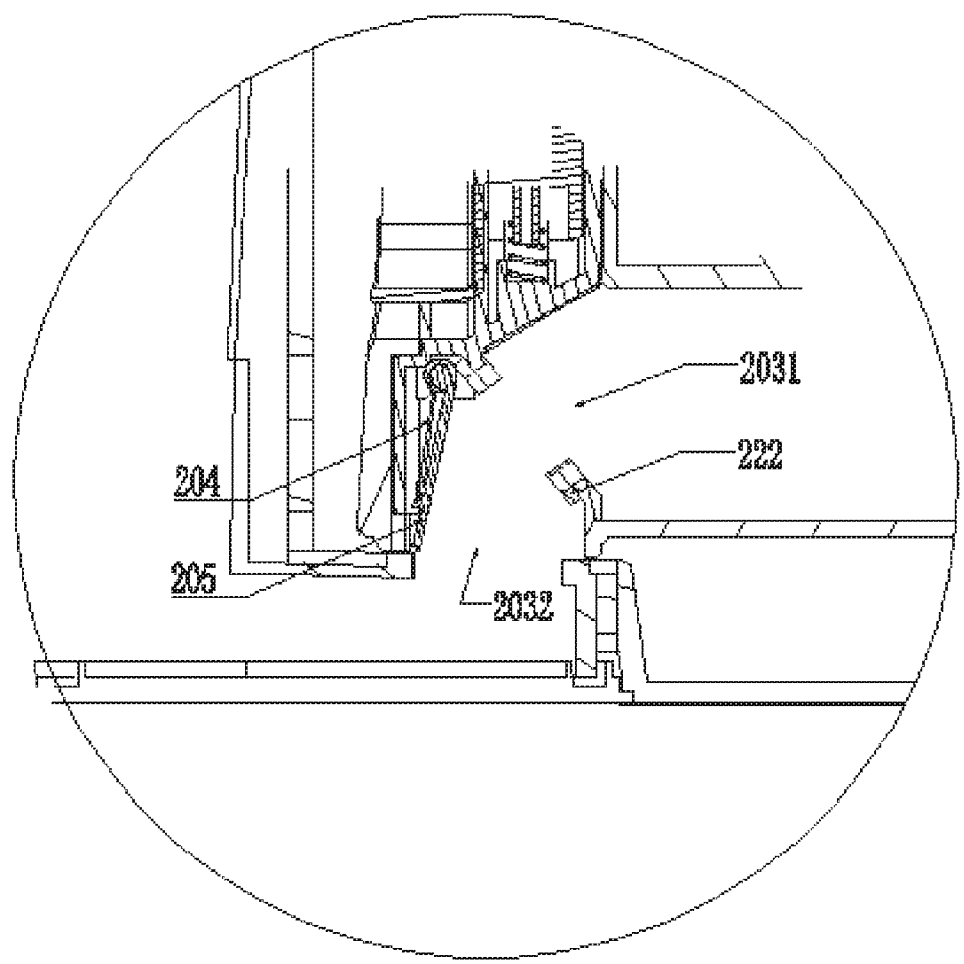
FIG. 13 is a structural diagram when the dust-box discharge port is opened.

With reference to FIGS. 8, 10 and 12, shown are schematic views when the dust-box discharge port 203 is opened under a negative pressure. With reference to FIGS. 9, 11 and 13, shown are schematic views when the dust-box discharge port 203 is closed under the action of a valve torsion spring. The dust-box discharge port 203 has a dust inlet end 2031 and a dust discharge end 2032. A check valve assembly is mounted on an outer side of the dust inlet end 2031. The check valve assembly includes a valve 204, a valve torsion spring 205 and a valve rotating shaft 206. The valve rotating shaft 206 is fixedly mounted on the outer side of the dust inlet end 2031. The valve 204 is rotatably mounted on the valve rotating shaft 206. When the valve 204 is rotated and pressed onto the dust inlet end 2031, the valve 204 seals the dust inlet end 2031. The valve torsion spring 205 is arranged on an outer side face of the valve 204. The valve torsion spring 205 is used for applying, to the valve 204, a press force toward the dust inlet end 2031, so as to press the valve 204 onto the dust inlet end 2031. During a specific implementation, a fixed pipe 207 is fixedly mounted on the outer side face of the valve 204. After the valve torsion spring 205 passes through the fixed pipe 207, left and right ends of the valve torsion spring 205 are wound around the valve rotating shaft 206, respectively.

When the outer side face of the valve 204 is under a negative pressure, due to the negative pressure, the valve 204 overcomes the press force from the valve torsion spring 205 and moves in an opposite direction to open the dust inlet end 2031. With reference to FIG. 18, a schematic view when the valve 204 is opened and the maintenance station 100 removes dust from the dust box by vacuum is shown, where the direction indicated by the arrow is a flow direction of the garbage from the dust box to the dust bag of the maintenance station.

In practical applications, the maintenance station 100 has a cover plate 108 used for opening the dust bag accommodating box 104.

The dust bag in the maintenance station can be replaced by opening the cover plate. The dust bag is a disposable dust bag.

In the present invention, the maintenance station removes dust by vacuum, and it is unnecessary to take out the dust box from the floor sweeping robot to remove dust from the dust box 202 by vacuum. However, in the present invention, a dust box release button 219 is also arranged on the dust box, so that a function of manually taking out the dust box from the floor sweeping robot and then cleaning the dust box is also supported.

Figure 6:
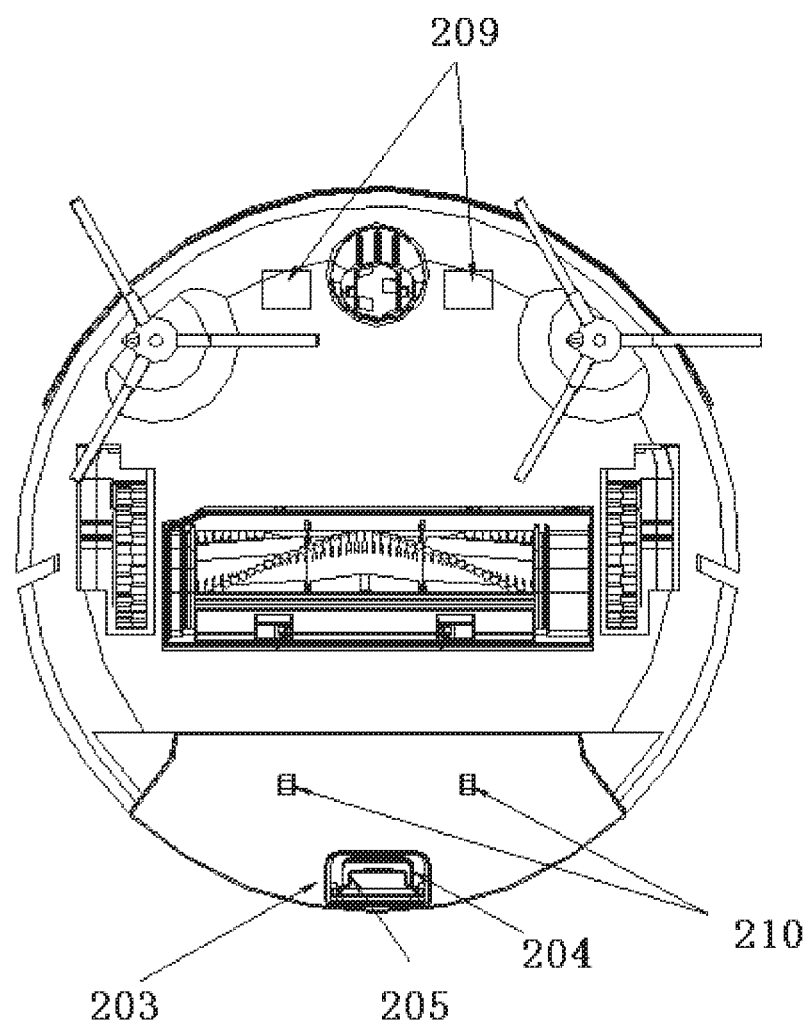
FIG. 6 is a bottom view of the floor sweeping robot after the water tank is taken out from the floor sweeping robot and when the dust-box discharge port is closed.
Figure 7:
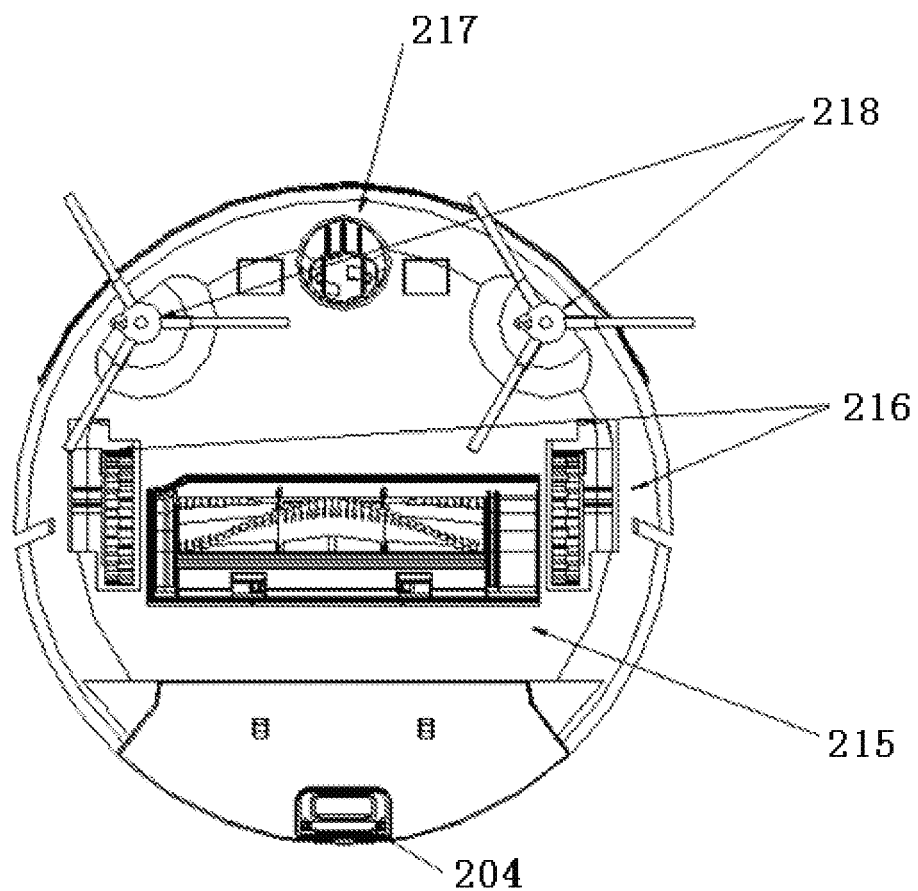
FIG. 7 is a bottom view of the floor sweeping robot after the water tank is taken out from the floor sweeping robot and when the dust-box discharge port is opened.

The floor sweeping robot 200 has a basic floor sweeping function. With reference to FIGS. 6 and 7, an intermediate sweeper 215 is arranged on the bottom of the floor sweeping robot 200, and driving wheels 216 are mounted on two sides of the intermediate sweeper. A universal wheel 217 and side brushes 218 are mounted on a bottom edge of the floor sweeping robot 200. By driving the floor sweeping robot 200 to move by the driving wheels 216 and with the help of the intermediate sweeper 215 and the side brushes 218, the floor sweeping function is realized.

A water tank 208 is detachably mounted on a bottom of the floor sweeping robot body 201 and located outside the dust-box discharge port 203, and a water tank detector 213 for detecting whether the water tank 208 is mounted is arranged on the floor sweeping robot body 201.

Figure 22:
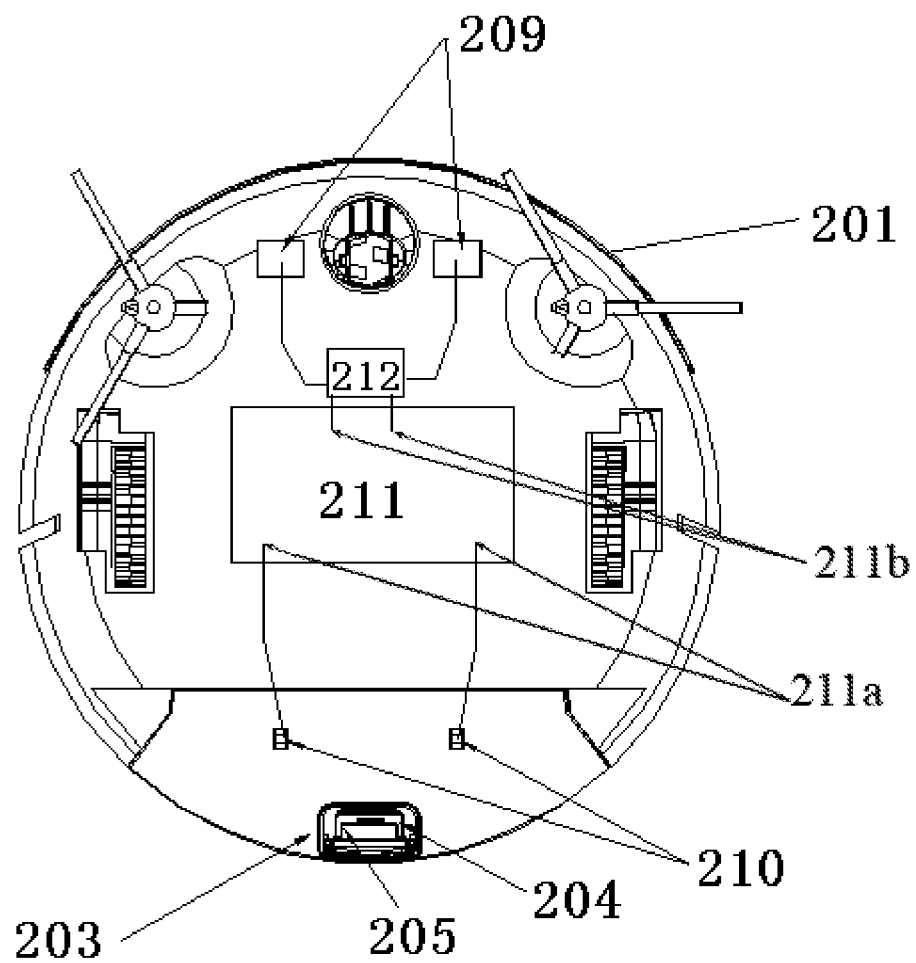
FIG. 22 is an arrangement diagram of a circuit board on the bottom of the floor sweeping robot.
Figure 23:
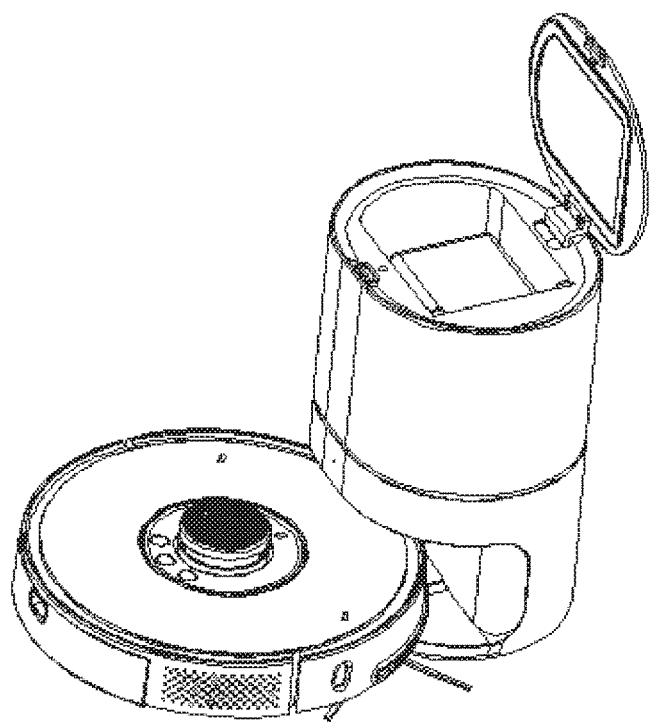
FIG. 23 is a state diagram when the cover plate of the maintenance station is opened.
Figure 24:
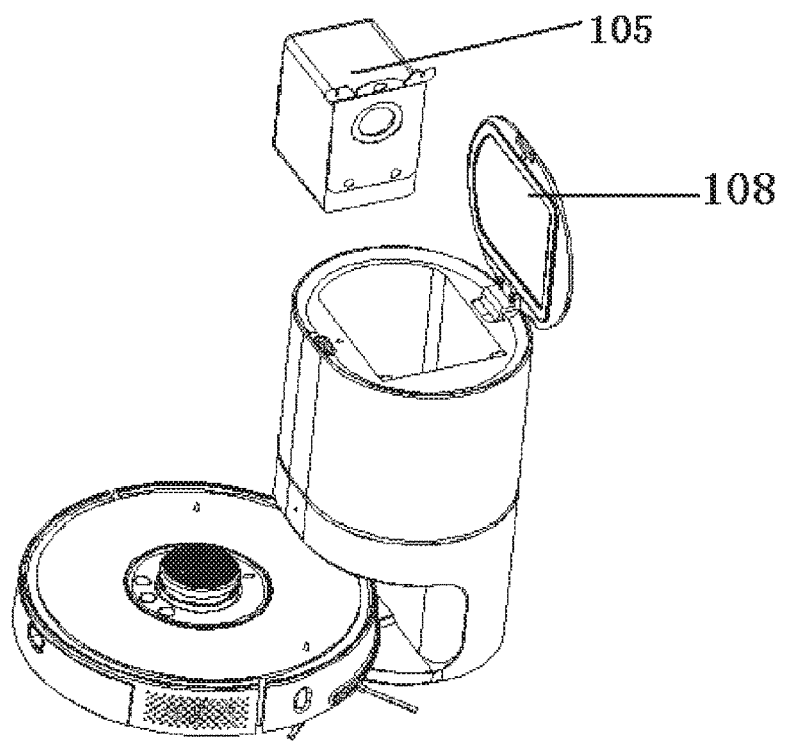
FIG. 24 is a state diagram when the dust bag is taken out from the maintenance station.
Figure 25:
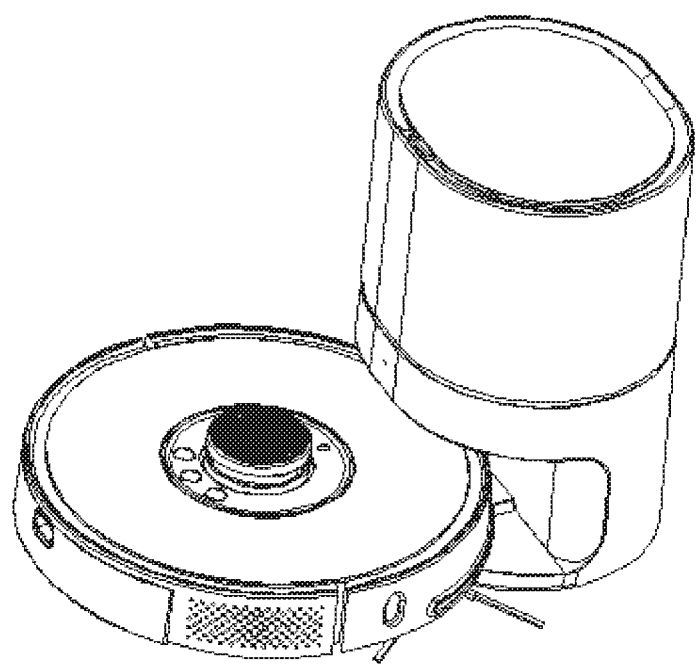

To realize both the charging function and the dust removal function, with reference to FIG. 22, a maintenance station contact tab 102 is arranged on the charging and dust suction base 101 A charging contact tab 209 is mounted at one end of the bottom of the floor sweeping robot body 201. A dust discharge contact tab 210 is mounted on the other side of the bottom of the floor sweeping robot body 201.

A floor sweeping robot mainboard 211 and a rechargeable battery 212 are mounted inside the floor sweeping robot body 201. A first pin 211a of the floor sweeping robot mainboard 211 is electrically connected to the dust discharge contact tab 210. A second pin 211b of the floor sweeping robot mainboard 211 is connected to one end of the rechargeable battery 212, and the other end of the rechargeable battery 212 is electrically connected to the charging contact tab 209. The floor sweeping robot mainboard 211 is also electrically connected to the water tank detector 213.

A maintenance station controller is mounted in the maintenance station 100, and the maintenance station controller is connected to the maintenance station contact tab 102, the dust suction fan 107 and a charging control circuit, respectively.

The present invention further provides a dust suction and charging method of a dust suction and charging device for a floor sweeping robot, including the following steps.

Step 1: A plurality of infrared emitters are mounted in different regions of a maintenance station 100, the infrared emitters are activated when a floor sweeping robot 200 requires maintenance, and the infrared emitters emit infrared signals to different directions.

An infrared receiver arranged in the floor sweeping robot 200 receives the infrared signals and determines a relative position between the infrared receiver and the maintenance station 100 using the received infrared signals. Then, the floor sweeping robot 200 moves close to the maintenance station 100 according to the relative position.

Meanwhile, the floor sweeping robot 200 detects by a water tank detector 213 whether a water tank 208 is mounted; steps 2-5 will be executed if the water tank 208 is not mounted; and, steps 6-7 will be executed if the water tank 208 is mounted.

Step 2: The floor sweeping robot 200 adjusts its own direction to allow one end of the floor sweeping robot 200 where a dust discharge contact tab 210 is mounted faces toward the maintenance station 100. At this time, the state is shown in FIG. 15.

Then, the floor sweeping robot 200 continues to move forward. When the floor sweeping robot 200 detects that the dust discharge contact tab 210 contacts and conducts with a maintenance station contact tab 102 of the maintenance station 100, it indicates that the floor sweeping robot 200 has moved in place. FIG. 16 shows a state diagram when the floor sweeping robot 200 has moved in place. At this time, a dust-box discharge port 203 of the floor sweeping robot 200 is just pressed onto a maintenance-station dust suction port 103 of the maintenance station 100, and the floor sweeping robot 200 controls itself to stop moving.

Step 3: When the dust discharge contact tab 210 of the floor sweeping robot 200 contacts and conducts with the maintenance station contact tab 102 of the maintenance station 100, for the maintenance station 100, a maintenance station controller detects a dust discharge signal indicating that the dust discharge contact tab 210 conducts with the maintenance station contact tab 102, and the maintenance station controller activates the dust suction process of the floor sweeping robot 200. The state is shown in FIG. 18.

With reference to FIG. 18, the maintenance station controller activating the dust suction process of the floor sweeping robot 200 includes specifically:

Step 3.1: The maintenance station controller activates a dust suction fan 107, and the dust suction fan 107 generate a negative pressure in a dust bag accommodating box 104, and then generates a negative pressure in a dust suction hose 106.

Step 3.2: When a negative pressure is generated in the dust suction hose 106, due to the negative pressure, a valve 204 overcomes a press force from a valve torsion spring 205 and moves in an opposite direction to open a dust inlet end 2031, so that the dust-box discharge port 203 is opened.

Step 3.3: When the dust-box discharge port 203 is opened, due to the negative pressure, garbage in a cavity of the dust box 202 successively passes through the dust-box discharge port 203 and the maintenance-box dust suction port 103 to be sucked into the dust suction hose 106 and then sucked into the dust bag 105.

Step 3.4: After the dust suction operation of the dust box 202 is completed, the maintenance station controller turns off the dust suction fan 107. As the negative pressure disappears, the valve 204 is pressed onto the dust inlet end 2031 of the dust-box discharge port 203 under the action of the valve torsion spring 205, so that the dust inlet end 2031 of the dust-box discharge port 203 is sealed and the garbage in the dust box 202 is prevented from leakage.

Step 3.5: The dust removal operation of the dust box 202 ends.

Figure 20:
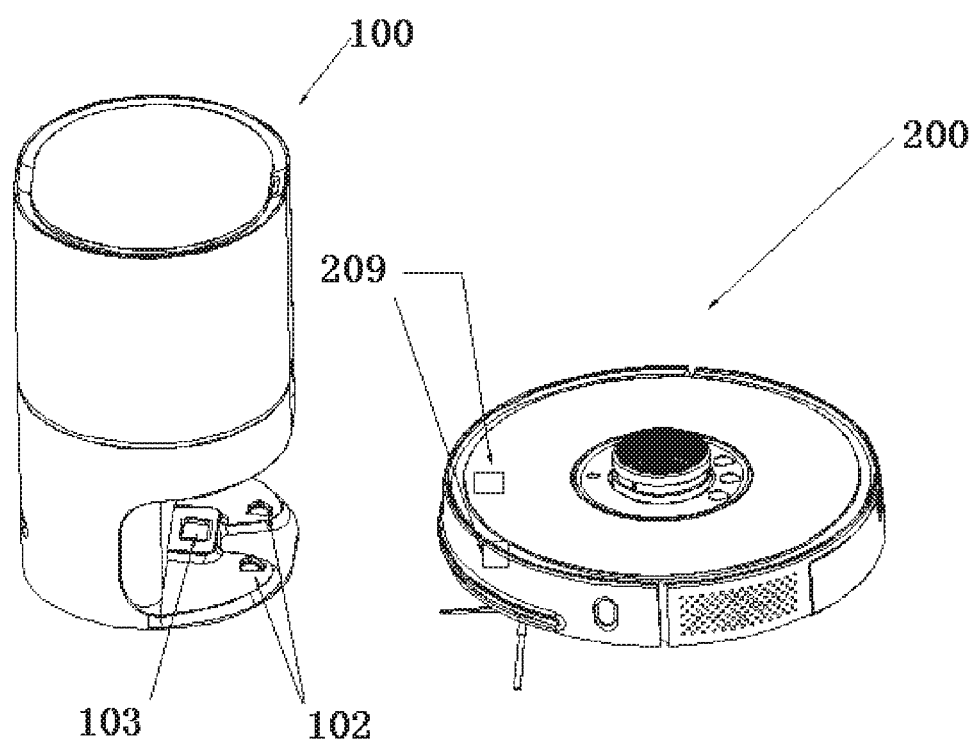
FIG. 20 is a process diagram of the floor sweeping robot moving close to the maintenance station when it is to be charged.

Step 4: The floor sweeping robot 200 moves away from the maintenance station 100 by a certain distance and is rotated by a certain angle, so that a charging contact tab 209 of the floor sweeping robot 200 faces toward the maintenance station 100. The state is shown in FIG. 20.

Figure 21:
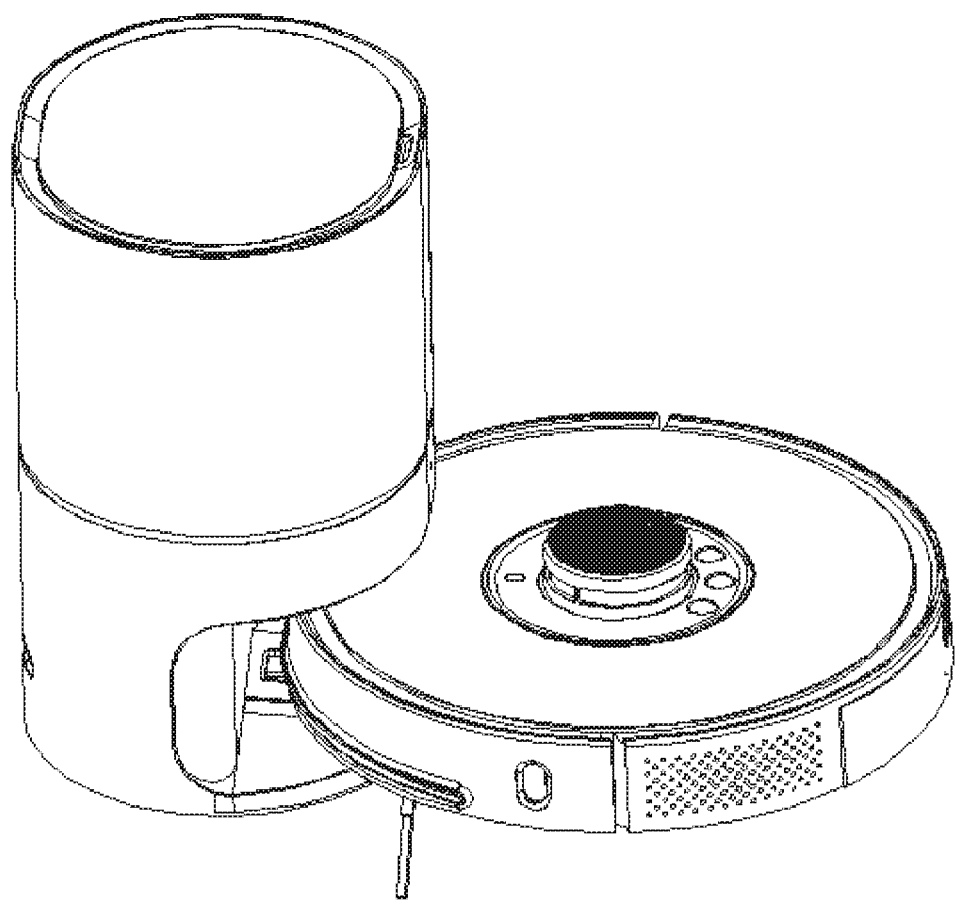
FIG. 21 is a state diagram of the floor sweeping robot moving in place when it is to be charged.

Then, the floor sweeping robot 200 continues to move forward. When the floor sweeping robot 200 detects that the charging contact tab 209 contacts and conducts with the maintenance station contact tab 102 of the maintenance station 100, it indicates that the floor sweeping robot 200 has moved in place, and the floor sweeping robot 200 controls itself to stop moving at this time. The state is shown in FIG. 21.

Step 5: When the charging contact tab 209 of the floor sweeping robot 200 contacts and conducts with the maintenance station contact tab 102 of the maintenance station 100, for the maintenance station 100, the maintenance station controller detects a charging signal indicating that the charging contact tab 209 conducts with the maintenance station contact tab 102, and the maintenance station controller activates the charging process of the floor sweeping robot 200 until the charging operation is completed.

Step 6: The floor sweeping robot 200 adjusts its own direction to allow one end of the floor sweeping robot 200 where the charging contact tab 209 is mounted faces toward the maintenance station 100. The state is shown in FIG. 20.

Then, the floor sweeping robot 200 continues to move forward. When the floor sweeping robot 200 detects that the charging contact tab 209 contacts and conducts with the maintenance station contact tab 102 of the maintenance station 100, it indicates that the floor sweeping robot 200 has moved in place, and the floor sweeping robot 200 controls itself to stop moving at this time. The state is shown in FIG. 21.

Step 7: When the charging contact tab 209 of the floor sweeping robot 200 contacts and conducts with the maintenance station contact tab 102 of the maintenance station 100, for the maintenance station 100, the maintenance station controller detects a charging signal indicating that the charging contact tab 209 conducts with the maintenance station contact tab 102, and the maintenance station controller activates the charging process of the floor sweeping robot 200 until the charging operation is completed.

The dust suction and charging device for a floor sweeping robot and the dust suction and charging method thereof provided by the present invention have the following advantages.

(1) A charging contact tab and a dust discharge contact tab are arranged at different positions on the bottom of the floor sweeping robot, and a maintenance station contact tab is arranged on the charging base of the maintenance station. When the charging contact tab comes into contact with the maintenance station contact tab, the maintenance station charges and maintains the floor sweeping robot; and, when the dust discharge contact tab comes into contact with the maintenance station contact tab, the maintenance station removes dust in the dust box of the floor sweeping robot by vacuum. Thus, the charging, dust removal and maintenance operations on the floor sweeping robot are realized simultaneously, and the functions are diversified.

(2) During the dust removal and maintenance of the floor sweeping robot by the maintenance station, garbage such as dust in the dust box of the floor sweeping robot is sucked into the dust bag of the maintenance station by vacuum, so it is unnecessary to take out the dust box from the floor sweeping robot for cleaning. Therefore, the present invention is convenient to clean and will not pollute the external environment.

The foregoing description merely shows preferred implementations of the present invention. It should be pointed out that, for a person of ordinary skill in the art, various improvements and modifications can be made without departing from the principle of the present invention, and these improvements and modifications shall be deemed as falling into the protection scope of the present invention.

The invention claimed is:

1. A dust suction and charging device for a floor sweeping robot, comprising a maintenance station and a floor sweeping robot;

a charging and dust suction base is provided in a lower portion of the maintenance station, and a maintenance-station dust suction port is formed on the charging and dust suction base; a dust bag accommodating box is arranged inside the maintenance station, and a dust bag is arranged inside the dust bag accommodating box; a dust suction fan is arranged outside the dust bag accommodating box and located in a cavity of the maintenance station, and an air suction port of the dust suction fan is communicated with the dust bag accommodating box to allow a negative pressure to be generated in the dust bag accommodating box; one end of a dust suction hose comes into contact with a dust inlet end of the dust bag, while the other end of the dust suction hose is fixedly connected to the maintenance-station dust suction port;

the floor sweeping robot has a floor sweeping robot body; a dust box is arranged on one side of the floor sweeping robot; a dust-box discharge port is formed on a bottom of the dust box; the dust-box discharge port corresponds to the maintenance-station dust suction port; and, the maintenance-station dust suction port is communicated with the dust-box discharge port by pressing an outer surface of the maintenance-station dust suction port; and the dust-box discharge port has a dust inlet end and a dust discharge end; a check valve assembly is mounted on an outer side of the dust inlet end; the check valve assembly comprises a valve, a valve torsion spring and a valve rotating shaft; the valve rotating shaft is fixedly mounted on the outer side of the dust inlet end; the valve is rotatably mounted on the valve rotating shaft; when the valve is rotated and pressed onto the dust inlet end, the valve seals the dust inlet end; the valve torsion spring is arranged on an outer side face of the valve and is used for applying, to the valve, a press force toward the dust inlet end, so as to press the valve onto the dust inlet end; and, when the outer side face of the valve is under a negative pressure, due to the negative pressure, the valve overcomes the press force from the valve torsion spring and moves in an opposite direction to open the dust inlet end;

wherein a water tank is detachably mounted on a bottom of the floor sweeping robot body and located outside the dust-box discharge port, and a water tank detector for detecting whether the water tank is mounted is arranged on the floor sweeping robot body;

wherein a maintenance station contact tab is arranged on the charging and dust suction base, a charging contact tab is mounted at one end of the bottom of the floor sweeping robot body, and a dust discharge contact tab is mounted on the other end of the bottom of the floor sweeping robot body;

a floor sweeping robot mainboard and a rechargeable battery are mounted inside the floor sweeping robot body; a first pin of the floor sweeping robot mainboard is electrically connected to the dust discharge contact tab; a second pin of the floor sweeping robot mainboard is connected to one end of the rechargeable battery, and the other end of the rechargeable battery is electrically connected to the charging contact tab; and the floor sweeping robot mainboard is also electrically connected to the water tank detector; and a maintenance station controller is mounted in the maintenance station, and the maintenance station controller is connected to the maintenance station contact tab, the dust suction fan and a charging control circuit, respectively.

2. The dust suction and charging device for the floor sweeping robot according to claim 1, wherein a fixed pipe is fixedly mounted on the outer side face of the valve; and, after the valve torsion spring passes through the fixed pipe, left and right ends of the valve torsion spring are wound around the valve rotating shaft, respectively.

3. The dust suction and charging device for the floor sweeping robot according to claim 1, wherein the maintenance station has a cover plate used for opening the dust bag accommodating box.

4. The dust suction and charging device for the floor sweeping robot according to claim 1, wherein the dust box has a cover for manually opening the dust box.

5. The dust suction and charging device for the floor sweeping robot according to claim 1, wherein an intermediate sweeper is arranged on the bottom of the floor sweeping robot; driving wheels are mounted on two sides of the intermediate sweeper; and, a universal wheel and side brushes are mounted on a bottom edge of the floor sweeping robot.

6. A dust suction and charging method of the dust suction and charging device for the floor sweeping robot according to claim 1, comprising the following steps:

step 1: a plurality of infrared emitters are mounted in different regions of a maintenance station, the infrared emitters are activated when a floor sweeping robot requires maintenance, and the infrared emitters emit infrared signals to different directions;

an infrared receiver arranged in the floor sweeping robot receives the infrared signals and determines a relative position between the infrared receiver and the maintenance station using the received infrared signals, and the floor sweeping robot moves close to the maintenance station according to the relative position;

meanwhile, the floor sweeping robot detects by a water tank detector whether a water tank is mounted; steps 2-5 will be executed if the water tank is not mounted; and, steps 6-7 will be executed if the water tank is mounted;

step 2: the floor sweeping robot adjusts its own direction to allow one end of the floor sweeping robot where a dust discharge contact tab is mounted faces toward the maintenance station;

the floor sweeping robot then continues to move forward; when the floor sweeping robot detects that the dust discharge contact tab contacts and conducts with a maintenance station contact tab of the maintenance station, it indicates that the floor sweeping robot has moved in place, a dust-box discharge port of the floor sweeping robot is just pressed onto a maintenance-station dust suction port of the maintenance station; and the floor sweeping robot controls itself to stop moving;

step 3: when the dust discharge contact tab of the floor sweeping robot contacts and conducts with the maintenance station contact tab of the maintenance station, for the maintenance station, a maintenance station controller detects a dust discharge signal indicating that the dust discharge contact tab conducts with the maintenance station contact tab, and the maintenance station controller activates the dust suction process of the floor sweeping robot;

wherein the maintenance station controller activating the dust suction process of the floor sweeping robot comprises specifically:

step 3.1: the maintenance station controller activates a dust suction fan, and the dust suction fan generate a negative pressure in a dust bag accommodating box, and then generates a negative pressure in a dust suction hose;

step 3.2: when a negative pressure is generated in the dust suction hose, due to the negative pressure, a valve overcomes a press force from a valve torsion spring and moves in an opposite direction to open a dust inlet end, so that the dust-box discharge port is opened;

step 3.3: when the dust-box discharge port is opened, due to the negative pressure, garbage in a cavity of the dust box successively passes through the dust-box discharge port and the maintenance-box dust suction port to be sucked into the dust suction hose and then sucked into the dust bag;

step 3.4: after the dust suction operation of the dust box is completed, the maintenance station controller turns off the dust suction fan; as the negative pressure disappears, the valve is pressed onto the dust inlet end of the dust-box discharge port under the action of the valve torsion spring, so that the dust inlet end of the dust-box discharge port is sealed and the garbage in the dust box is prevented from leakage; and step 3.5: the dust removal operation of the dust box ends;

step 4: the floor sweeping robot moves away from the maintenance station by a certain distance and is rotated by a certain angle, so that a charging contact tab of the floor sweeping robot faces toward the maintenance station;

the floor sweeping robot then continues to move forward; when the floor sweeping robot detects that the charging contact tab contacts and conducts with the maintenance station contact tab of the maintenance station, it indicates that the floor sweeping robot has moved in place, and the floor sweeping robot controls itself to stop moving at this time;

step 5: when the charging contact tab of the floor sweeping robot contacts and conducts with the maintenance station contact tab of the maintenance station, for the maintenance station, the maintenance station controller detects a charging signal indicating that the charging contact tab conducts with the maintenance station contact tab, and the maintenance station controller activates the charging process of the floor sweeping robot until the charging operation is completed;

step 6: the floor sweeping robot adjusts its own direction to allow one end of the floor sweeping robot where the charging contact tab is mounted faces toward the maintenance station;

the floor sweeping robot then continues to move forward; when the floor sweeping robot detects that the charging contact tab contacts and conducts with the maintenance station contact tab of the maintenance station, it indicates that the floor sweeping robot has moved in place, and the floor sweeping robot controls itself to stop moving at this time; and step 7: when the charging contact tab of the floor sweeping robot contacts and conducts with the maintenance station contact tab of the maintenance station, for the maintenance station, the maintenance station controller detects a charging signal indicating that the charging contact tab conducts with the maintenance station contact tab, and the maintenance station controller activates the charging process of the floor sweeping robot until the charging operation is completed.

* * * * *